United States Patent [19]

Pan

[11] 4,240,694
[45] Dec. 23, 1980

[54] SINGLE OPTICAL FIBER DIRECTIONAL COUPLER

[75] Inventor: Jing-Jong Pan, Melbourne, Fla.

[73] Assignee: Harris Communications, Cleveland, Ohio

[21] Appl. No.: 839,815

[22] Filed: Oct. 6, 1977

[51] Int. Cl.$^3$ ............................................. G02B 5/14
[52] U.S. Cl. .............................. 350/96.16; 350/96.15
[58] Field of Search ............... 350/96.15, 96.16, 96.20, 350/96.21, 96.22

[56] References Cited

U.S. PATENT DOCUMENTS

| | | | |
|---|---|---|---|
| 3,809,686 | 5/1974 | Chandross et al. | 204/159.14 |
| 3,874,780 | 4/1975 | Love | 350/96.16 |
| 3,883,222 | 5/1975 | Gunderson | 350/96.16 |
| 3,937,557 | 2/1976 | Milton | 350/96.16 |
| 4,009,931 | 3/1977 | Malsby et al. | 350/96.22 |
| 4,027,153 | 5/1977 | Käch | 350/96.16 X |
| 4,072,399 | 2/1978 | Love | 350/96.16 |
| 4,087,156 | 5/1978 | Kao et al. | 350/96.15 X |
| 4,113,345 | 9/1978 | Gerndt | 350/96.15 |

FOREIGN PATENT DOCUMENTS 1406277 9/1975 United Kingdom .

OTHER PUBLICATIONS

Hudson et al., "The Star Coupler:A Unique . . . ", *Applied Optics*, vol. 13, No. 11, Nov. 1974, pp. 2540-2545.

Barnoski, "Data Distribution using Fiber Optics," *Applied Optics*, vol. 14, No. 11, Nov. 1975, pp. 2571-2577.

*Primary Examiner*—John K. Corbin
*Assistant Examiner*—John D. Lee
*Attorney, Agent, or Firm*—Watson, Cole, Grindle & Watson

[57] ABSTRACT

A coupler for transferring signals from a first group of single optical fibers to a second group of single optical fibers. The coupler provided for this purpose is a directional star coupler which is constructed so as to eliminate any need for the employment of a mixing chamber. A covering, or cladding, generally covers each optical fiber in order to prevent light from being emitted through the circumferential surface of such fiber. At an end portion of each of the fibers of both the first and second groups, the cladding is treated so as to allow light to be emitted from the circumferential surface of such portion. The end portions of the fibers of the first group are fed through an opening at one side of a coupling chamber. The end portions of the fibers of the second group are fed through another opening within the coupling chamber. The first and second groups of fibers are arranged within the chamber so that their end faces are in abutment with each other. In this manner, signals transmitted along any of the fibers of the first group are transferred to all of the fibers of the second group.

7 Claims, 4 Drawing Figures

U.S. Patent
Dec. 23, 1980
4,240,694
FIG. 1
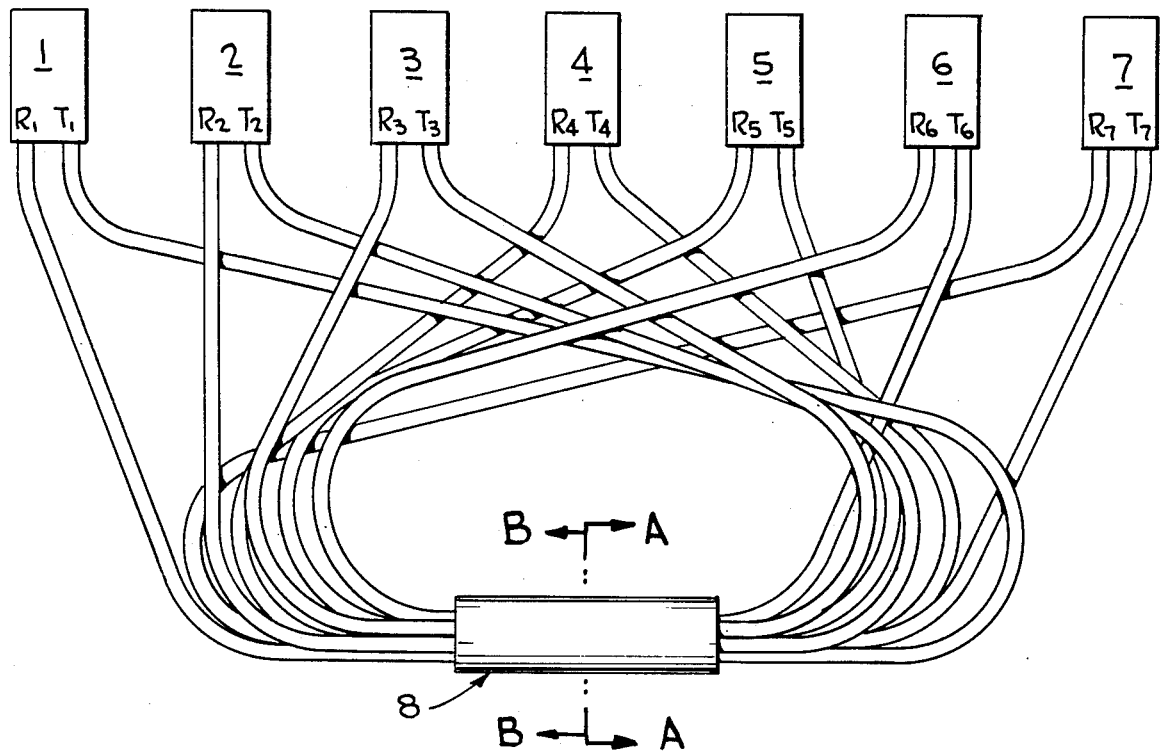
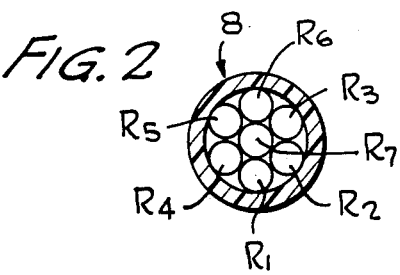
FIG. 2
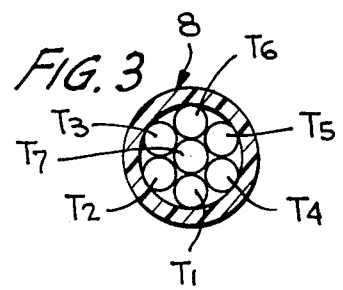
FIG. 3
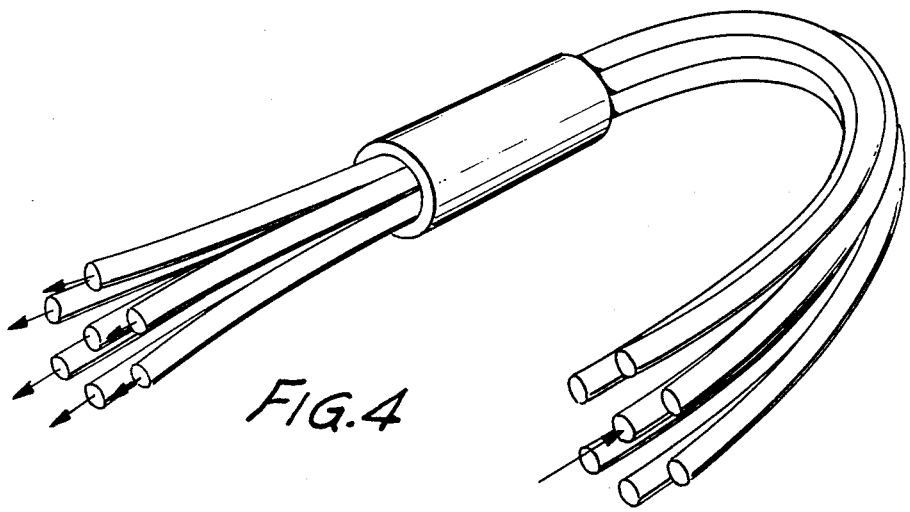
FIG. 4

SINGLE OPTICAL FIBER DIRECTIONAL COUPLER

BACKGROUND OF THE INVENTION

The present invention involves a star coupler for directly coupling signals between a first group of optical fibers and a second group of optical fibers.

In recent years there has been a growing interest in the possibility of utilizing optical fibers for the transmission of information. Optical fibers offer the advantages of exhibiting low loss in the amplitudes of the signals and providing a high bandwidth thereby enabling a significant amount of information to be transmitted over each fiber. In order to transmit information between a plurality of terminals through the optical fibers, it is necessary that the fibers be coupled together in some manner; otherwise, there would have to be separate fibers interconnecting each terminal. A Tee coupler system has generally been employed for this purpose. In a Tee type coupler, the optical fibers from a terminal are coupled to a general transmission line which then carries the signals to other terminals. Such Tee type couplers, however, suffer from connector losses and packing fraction losses.

In order to overcome some of the problems involved with the Tee type couplers, a star type coupler has been developed by Corning Glass Works. The star coupler transfers signals transmitted along optical fibers from a first group of terminals to the optical fibers coupled to a second group of terminals. In such a star type coupler, both the transmitting and receiving fiber optics are connected to a cladded glass mixing rod. The fibers can be either supplied at one end of the mixing rod with a mirror being positioned at the opposite end or the fibers from one set of terminals can be supplied to one end of the mixing rod while the fibers from the other group of terminals are supplied to the opposite side. In either case, however, the fibers do not pass through the mixing rod. Instead, as the signals leave the ends of the fibers and pass through the mixing rod, the signals are internally reflected by the glass core of the mixing rod. By providing a mixing rod of an appropriate length, sufficient reflections within the rod occur in order that the signals supplied by any of the fibers from one group of terminals will be reflected within the rod and received by all of the fibers of the other group of terminals.

Such Tee type couplers and star type couplers are discussed in an article entitled "The Star Coupler: A Unique Interconnection Component for Multimode Optical Waveguide Communications Systems", *Applied Optics*, Vol. 13, No. 11, November 1974. This article from *Applied Optics* discloses a star coupler in which all of the fibers enter from one side with a mirror being positioned at the other side.

As previously noted, the fibers from a first group of terminals can enter such a star coupler from one end while the fibers from the other group of terminals are connected to the star coupler at the opposite end. An example of the second type of star coupler is shown in British Pat. No. 1,406,277 to Plessey Company Ltd., which was published on Sept. 17, 1975. In the star coupler disclosed by the British Patent, an uncladded end portion of each fiber of the first group of fibers is fed a short distance into one end of the coupler, while the uncladded end portions of a second group of fibers are fed into the coupler from the opposite end. By providing glass mixing rods within the center of the coupler in a space between the two groups of fibers, the signals from any fiber are reflected by the glass wall of the mixing rod so that such signals are received by all the fibers of the other group. Another embodiment of this second type of a star coupler is illustrated in U.S. Pat. No. 3,937,557 to Milton, which issued on Feb. 10, 1976.

In comparison with the Tee coupler system, the star coupler system has been shown to exhibit a lower terminal-to-terminal loss, easier upgradability and better reliability. Moreover, the star coupler can be constructed with a very low insertion loss and one such coupler can serve a plurality of terminals.

The star coupler employing a mixing rod can be utilized for coupling signals between both fiber bundles and single fiber configurations. This type of star coupler, however, exhibits several disadvantages: high insertion loss (although the loss is less than that of the Tee coupler), uneven light distribution, high fabrication cost and no directivity (i.e. since the coupler is essentially bi-directional the signals which are reflected within the mixing rod can be transmitted back along the fiber which has supplied the signal). With respect to the last problem, it is noted that backtracking of the signal can cause distortion in the signals being transmitted and for this reason, it is preferable for the coupler to be directional.

It has also been known that information can be coupled between two optical fibers by arranging a portion of each fiber in an adjacent parallel relationship. If the adjacent portions of the fibers are free of any cladding, then the signals for one fiber will be transmitted into the adjacent fiber. An example of such a system is illustrated in U.S. Pat. No. 3,809,686 to Chandross et al, which issued May 7, 1974.

SUMMARY OF THE INVENTION

An object of the present invention is to provide an optical fiber directional coupler that overcomes the disadvantages of previous Tee couplers and star couplers as discussed above.

Another object of the present invention is to provide an optical fiber directional star coupler exhibiting low insertion loss.

A further object of the present invention is to provide an optical fiber directional star coupler exhibiting a high degree of directivity.

Still another object of the present invention is to provide a single optical fiber directional star coupler which is relatively small, light weight and inexpensive to fabricate.

Still a further object of the present invention is to provide a single fiber directional star coupler which provides for even power distribution among the various fibers to which signals are transmitted via the coupler.

In order to achieve these objectives, a star coupler for coupling information between single optical fibers is constructed in accordance with the present invention. A first group of single optical fibers with each having an end portion free of any cladding are arranged in a group with one of the fibers being located at the center and the other fibers of this group surrounding such centrally arranged fiber. A second group of single optical fibers with each having an end portion free of any cladding are similarly arranged with one fiber serving as a center fiber and the other fibers of the second group surrounding such centrally arranged fiber. The second group of fibers are then arranged with their end faces sufficiently close to the end faces of the fibers of the first group so that signals emitted from the end faces of the fibers of the first group pass directly into corresponding fibers of the second group. The uncladded portion of both the first group of fibers and the second group of fibers are inserted into a coupling chamber and are arranged in the desired relationship. In this manner, when a signal is being transmitted along any one of the fibers of the first group and directly transferred into a corresponding fiber of the second group, the signals are simultaneously transferred to the other adjacent fibers through the uncladded portions of the fibers. Consequently, direct coupling is carried out between the two groups of fibers without the necessity and disadvantages inherent in the utilization of a mixing rod.

The directional star coupler of the present invention also can serve as a power divider since the power within the signals travelling along one of the fibers of the first group is distributed to the adjacent fibers within the star coupler. At the same time, due to the transferal of the signal, the coupler serves as an information mixer so that a signal transmitted by any one line is received by all of the terminals coupled to the star coupler. Additional applications for such a star coupler are within data distribution and communication systems, switch array systems, mode discriminators and multiplexers and demultiplexers.

In another important aspect of the invention, the coupler utilizes continuous lengths of fibers instead of two separate groups of fibers. In addition, fiber optic connectors are coupled to the ends of these continuous lengths of fibers. Accordingly, the star coupler with continuous length with connectors is easy to fabricate and easy to use.

In order to optimize the effeciency of the coupler system, the fibers surrounding the central fiber in each group of fibers should be located at the vertices of an appropriate polygon. Thus, the first group of fibers should include n+1 fibers with the n fibers surrounding a centrally located fiber such that each of the n fibers is positioned at one of the vertices of an n-sided polygon. Likewise, the second group of fibers should include m+1 fibers with the m fibers surrounding a central fiber such that the m fibers are located at the vertices of an m-sided polygon.

The length of the coupler and similarly the length of the end portions of the fibers from which the cladding must be removed are functions of the diameter of the fibers, the difference in the refractive indexes of the fiber core and the cladding and finally the eigenvalues of the modes of the waves propagated within the fibers.

A brief mathematical model of the single fiber directional star coupler of the present invention is set forth below. The amplitude of a wave of the Pth mode propagated along the longitudinal axis of the jth fiber is denoted $a_p^{(j)}$. The equations demonstrating the mode coupling between the fibers can be described by the following two equations:

$$\sum_{j=1}^{n} \left( \frac{da_p^{(j)}}{dz} + i\beta_p^{(1)} a_p^{(j)} \right) = i2\gamma_n C_{pp}^{(1)(2)} \sum_{j=1}^{n} a_p^{(j)} + n\, C_{pp}^{(o)(1)} a_p^{(o)} \tag{1}$$

$$\frac{da_p^{(o)}}{dz} + i\beta_p^{(o)} a_p^{(o)} = C_{pp}^{(o)(1)} \sum_{j=1}^{n} a_p^{(j)} \tag{2}$$

In the above equation $\beta_p$ is the propagation constant of the Pth mode and $C_{pp}^{(j)(s)}$ is the coupling coefficient between fibers j and s of the Pth mode. Furthermore, $\gamma n=1$ for $n\geq 3$ and zero for $n<3$. The coupling coefficient is described by the following equation:

$$C_{pp}^{(j)(s)} = \frac{\omega}{2} \int_{A^{(s)}} (\epsilon^{(s)} - \epsilon)\, e_p^{(j)} \cdot e_p^{(s)*}\, dA \tag{3}$$

(*stands for the complex conjugate)

where $\epsilon^{(s)} - \epsilon$ is the difference between the dielectric constant of fiber s and its surrounding medium. The e is the electrical vector function which is independent of the direction of propagation and is found from the solutions of the transverse wave equation. A is an area integration in the x, y plane of the fiber.

Next, the following assumptions are made that the coupler is made up of n identical fibers (n=1, 2, ...), and the central fiber can be slightly different from its n neighbors and power transfer only occurs between the forward mode of one fiber and a forward mode with a similar $\beta_p$ of another fiber. If the fibers are different, it is possible for the Pth mode of fiber j to have a $\beta_p^{(j)}$ equal to $\beta_q^{(i)}$ of the qth mode of fiber i while $\beta_p^{(i)}$ is very different from $\beta_p^{(j)}$. The fields of the fibers are relatively small with respect to their coupling considerations and hence only the nearest neighbors need be taken into consideration. Thus, each of the fibers couple power equally into its two neighbors in addition to coupling the power into the central fiber. Thus, power transfer between the central fiber and the surrounding fibers is possible when the $$\beta_p^{(o)} = \beta_p^{(1)} - 2\gamma_n C_{pp}^{(1)(2)} \tag{4}$$

in a fiber length $L=\pi/2\beta_b$ (in this particular case $\beta_b = |C_{pp}|$).

In the above equation, two possible excitation conditions can now be considered. First, when the central fiber is excited, equal power is transferred to each of the surrounding fibers. Second, when one of the n fibers is excited, there is a power transfer among the n fibers as well as transfer of power to the central fiber; this type of power transfer does not alter the amount of power which is transferred to the central fiber, but instead redistributes the initial power among the n surrounding fibers.

The dominant mode of the waves propagated within the single fibers is generally the $HE_{11}$ mode. The total number of modes and the excitation of the dominant modes, however, are determined based upon the fiber configuration and the method utilized for exciting the fibers. The amplitude of the mode is determined by the fiber configuration and the amplitude of the optical source transmitting the wave into the fiber. In general terms, the propagation constant of the mode within the fiber is represented by the following equation.

$$\beta_p \approx V\{1 - \delta(U/V)^2\}/\sqrt{\delta} \tag{5}$$

where

-continued $$V^2 = \left(\frac{2\pi r n_1}{\lambda}\right)^2 \delta \quad (6)$$

$$\delta = 1 - \left(\frac{n_2}{n_1}\right)^2 \quad (7)$$

where:
  r = radius of the fiber
  $n_1$ = index of refraction of the fiber core
  $n_2$ = index of refraction of fiber cladding or the medium surrounding the core.
  $\lambda$ = wavelength
  U is the eigenvalue, for example, u = 2.405.

$$\exp\left[-(1-\frac{\lambda}{2})/V\right]$$

An example of the coupling which occurs between the i and j fibers when the wave being propagated is in the $HE_{11}$ mode is represented by the following equations.

$$C_{pp}^{(i)(j)} = \frac{\sqrt{\delta}}{r} \cdot \frac{K_o[W(d_{ij}/v)]}{K_1^2(W)} \quad (8)$$

where $K_o$ and $K_1$ are modified Hankel functions, or $$C_{pp} = \frac{5.8}{r}\left(\frac{2\delta}{\pi(d_{ij}/r)V^5}\right)\left(1 - \frac{1}{V}\right) \cdot \exp\left[-(Vd_{ij}/r - 2)\right] \quad (9)$$

where $d_{ij}$ is separation between fiber i and fiber j and V > 4.

The length of the coupling section of the coupler which is necessary in order to carry out effective coupling between the fibers is calculated in the following equation.

$$L = \pi/2 C_{pp}^{(i)(j)} \quad (10)$$

BRIEF DESCRIPTION OF THE DRAWINGS

FIG. 1 is a schematic illustration of a plurality of terminals interconnected through optical fibers coupled together by a coupler in accordance with the present invention.

FIG. 2 is a cross-sectional view through the coupler along lines A—A of FIG. 1.

FIG. 3 is a cross-sectional view through the coupler along lines B—B of FIG. 1.

FIG. 4 is a perspective view of a plurality of optical fibers inserted into a coupler in accordance with the present invention.

DESCRIPTION OF PREFERRED EMBODIMENTS

As shown in FIG. 1, each of the terminals, 1 through 7, have a first optical fiber extending from its transmission output and a second optical fiber extending from its receiving input. The optical fibers from the transmission output of each of the terminals, T1 through T7, is inserted into one side of coupler 8. The optical fibers, R1 through R7, which are connected to the receiving input of the terminals, are inserted into the end of coupler 8 opposite from the end at which transmitting fibers T1 through T7 are inserted. A perspective view showing the insertion of the fibers into the coupler is shown in FIG. 4.

Prior to inserting the optical fibers into coupler 8, a cladding around an end portion of each of the fibers is removed, or at least rendered neutral so as to allow light to be emitted from the circumferential surface of the fibers. Thus, while the portion of the fibers external to coupler 8 will be covered by an appropriate layer of cladding, a significant portion of each section of the fibers inserted into coupler 8 will be free of any cladding.

As can be seen from the cross-sectional views in FIGS. 2 and 3, the uncladded portions of both the transmitting and receiving fibers are arranged so that one fiber passes through the center with the other fibers surrounding the central fiber. Furthermore, the transmitting and receiving fibers are arranged within coupler 8 so that their end faces are in an abutting relationship.

First, a signal is supplied to one of the transmitting fibers, such as the central fiber as shown in FIG. 4. As the signal is transmitted along the uncladded portion of the fiber, however, the signal is transferred to all of the transmitting and receiving fibers surrounding the central fiber inside of the coupler. Thus, the signal which was supplied along the centrally located transmitting fiber is transferred into all of the receiving fibers leaving the coupler.

The procedure for constructing the star coupler of the present invention is briefly set forth below. First, it is necessary to select the desirable optical fibers based upon the refractive index profile, the core and cladding materials, the difference in the indices of refraction of the core and cladding, the core index and the core diameter of the fiber. From that information, the desired coupling length can then be computed by those equations previously set forth above. Next, the cladding is stripped off of an end portion of each of the fibers. The stripping of the cladding can be carried out by chemical etching, such as by using a hydrofluoric acid or a mechanical method. Alternatively, by an ion implantation method the refractive index of the cladding can be increased so that it is equal to the refractive index of the core, thereby in effect neutralizing the cladding. Each of the fibers in the transmitting and receiving groups of fibers are then arranged so as to form a polygon with a central fiber and n surrounding fibers located at the vertices of an n-sided polygon. These fibers are arranged in such a relationship inside of the coupler which encloses the uncladded portion of the fibers. The coupler is then filled with an appropriate amount of matching fluid which has the same index of refraction as the fiber core. Finally, the coupler is mechanically sealed.

The material which is utilized for the housing of the coupler should be selected so that it has the refractive index approximately equal to the cladding surrounding the optical fibers that are utilized. In this manner, while light will be emitted from the uncladded portions of the fibers inside of the coupler, the light will be prevented from leaving the coupler housing.

It is noted that the above description and the accompanying drawings are provided merely to present exemplary embodiments of the present invention and that additional modifications of these embodiments are possible within the scope of this invention without deviating from the spirit thereof.

I claim:

1. An optical fiber coupler comprising:
   a coupling chamber;
   a first group of single optical fibers inserted into said chamber, each of said first fibers having an end portion within said chamber free of any cladding and said first fibers being arranged such that one of said first fibers is at the center of said first group of fibers and the other said first fibers surround said centrally arranged first fiber; and,
   a second group of single optical fibers inserted into said chamber, each of said second fibers having an end portion within said chamber free of any cladding and said second fibers being arranged such that one of said second fibers is at the center of said second group of fibers and the other said second fibers surround said centrally arranged second fiber, the end faces of said second fibers being arranged sufficiently close to the end faces of said first fibers such that signals traveling within each of said first fibers can be directly transmitted into a corresponding said second fiber;
   whereby signals transmitted along any one of said first fibers is transferred to all of the other said first fibers through the end portions of such fibers that are free of cladding and such signals are also transferred to all of said second fibers within said coupling chamber.

2. A coupler as defined in claim 1 wherein each of said fibers of said first group of fibers is coupled to a respective transmitter and each of said fibers of said second group of fibers is coupled to a respective receiver so that said coupler only transmits signals in one direction.

3. A coupler as defined in claim 1 wherein said first group of fibers includes n plus 1 fibers, where n is at least 3 and such first fibers are arranged with said n fibers surrounding a central first fiber; said second group of fibers includes m plus one fibers where m is at least 3 and such fibers are arranged with said m fibers surrounding a central second fiber; and the numerical values of n and m are equal.

4. A coupler as defined in claim 3 wherein each of said n fibers of said first group of fibers is located at one of the vertices of an n-sided polygon and each of said m fibers of said second group of fibers is located at one of the vertices of an m-sided polygon.

5. A coupler as defined in claim 4 wherein said chamber is filled with a material having the same index of refraction as said optical fibers.

6. A coupler as defined in claim 1, wherein the end faces of said first fibers abut the end faces of said second fibers.

7. An optical fiber coupler comprising:
   a coupling chamber;
   a first group of single optical fibers, each of said first fibers being surrounded by a covering for preventing light signals transmitted through each of said first fibers from being emitted from the circumferential surface of each of said first fibers, an end portion of each of said first fibers being inserted into said chamber, a section of each of such inserted portions being treated such that light signals can be emitted from the circumferential surface of each of said first fibers, and said first fibers being arranged so that one such fiber is at the center and the other said first fibers surround such center fiber;
   a second group of single optical fibers, each of said second fibers being surrounded by a covering for preventing light signals transmitted through each of said second fibers from being emitted from the circumferential surface of each of said second fibers, and end portion of each of said second fibers being inserted into said chamber, a section of each of such inserted portions being treated such that light signals can be emitted from the circumferential surface of each of said second fibers, and said second fibers being arranged so that one such fiber is at the center and the other said second fibers surround such center fiber; and,
   wherein signals transmitted along any one of said first fibers are transferred to all of the other of said first fibers through said treated sections of such fibers inserted in said chamber and such signals are also transferred to all of said second fibers within said coupling chamber.

* * * * *

UNITED STATES PATENT OFFICE
CERTIFICATE OF CORRECTION

PATENT NO. : 4,240,694

DATED : December 23, 1980

INVENTOR(S) : Jing-Jong Pan

It is certified that error appears in the above-identified patent and that said Letters Patent are hereby corrected as shown below:

On the title page Item [73] should read:
-- Harris Corporation, Cleveland, Ohio --.

Signed and Sealed this

Fourteenth Day of July 1981

[SEAL]

Attest:

Attesting Officer

GERALD J. MOSSINGHOFF

Commissioner of Patents and Trademarks